US010709967B2

(12) United States Patent
He et al.

(10) Patent No.: US 10,709,967 B2
(45) Date of Patent: Jul. 14, 2020

(54) APPARATUS, METHODS, AND SYSTEMS FOR TRACKING AN OPTICAL OBJECT

(71) Applicant: Guangdong Virtual Reality Technology Co., Ltd., Shenzhen, Guangdong Province (CN)

(72) Inventors: Jie He, Shenzhen (CN); Jingwen Dai, Shenzhen (CN); Tao Zhu, Shenzhen (CN); Congling Wan, Shenzhen (CN)

(73) Assignee: GUANGDONG VIRTUAL REALITY TECHNOLOGY CO., LTD., Shenzhen, Guangdong Province (CN)

( * ) Notice: Subject to any disclaimer, the term of this patent is extended or adjusted under 35 U.S.C. 154(b) by 210 days.

(21) Appl. No.: 15/554,426

(22) PCT Filed: Oct. 27, 2015

(86) PCT No.: PCT/CN2015/092935
§ 371 (c)(1),
(2) Date: Aug. 30, 2017

(87) PCT Pub. No.: WO2017/070836
PCT Pub. Date: May 4, 2017

(65) Prior Publication Data
US 2018/0050264 A1 Feb. 22, 2018

(51) Int. Cl.
*A63F 13/213* (2014.01)
*A63F 13/24* (2014.01)
(Continued)

(52) U.S. Cl.
CPC ............ *A63F 13/213* (2014.09); *A63F 13/24* (2014.09); *A63F 13/25* (2014.09); *A63F 13/42* (2014.09);
(Continued)

(58) Field of Classification Search
CPC ........ A63F 13/428; A63F 13/24; A63F 13/25; A63F 13/213; A63F 13/42; G06T 7/262;
(Continued)

(56) References Cited

U.S. PATENT DOCUMENTS

| 7,654,952 B2 | 2/2010 | Ott |
| 2014/0086590 A1* | 3/2014 | Ganick .................. G06Q 30/02 398/118 |

(Continued)

FOREIGN PATENT DOCUMENTS

| CN | 1403884 A | 3/2003 |
| CN | 1637410 A | 7/2005 |

(Continued)

*Primary Examiner* — Michael A Cuff
(74) *Attorney, Agent, or Firm* — Cheng-Ju Chiang (57) ABSTRACT

A method for identifying one or more light sources may include capturing, via an imaging device, an image, the imaging device having a rolling shutter. The method may also include receiving, via at least one processor, the captured image, and detecting, via the at least one processor, whether the image includes a set of alternating stripes. The method may further include measuring, via the at least one processor, if the image includes a set of alternating stripes, a width of at least one stripe of the set of alternating stripes included in the captured image, and identifying, via the at least one processor, a light source causing the set of alternating stripes based on the measured width.

24 Claims, 6 Drawing Sheets

(51) Int. Cl.
*G06T 7/262* (2017.01)
*A63F 13/428* (2014.01)
*A63F 13/25* (2014.01)
*A63F 13/42* (2014.01)
*G06T 7/73* (2017.01)
*H04N 5/232* (2006.01)

(52) U.S. Cl.
CPC ............ *A63F 13/428* (2014.09); *G06T 7/262* (2017.01); *G06T 7/73* (2017.01); *H04N 5/2329* (2013.01); *H04N 5/23258* (2013.01); *G06T 2207/10152* (2013.01); *G06T 2207/30204* (2013.01); *G06T 2207/30244* (2013.01)

(58) Field of Classification Search
CPC ............ G06T 7/73; G06T 2207/30204; G06T 2207/30244; H04N 5/2329; H04N 5/23258

USPC .......................................................... 463/36
See application file for complete search history.

(56) References Cited

U.S. PATENT DOCUMENTS

| | | | |
|---|---|---|---|
| 2014/0372072 | A1* | 12/2014 | Guo .................... H04B 10/116 |
| | | | 702/150 |
| 2018/0191435 | A1* | 7/2018 | Gummadi ............ H04B 10/116 |

FOREIGN PATENT DOCUMENTS

| | | |
|---|---|---|
| CN | 1696673 A | 11/2005 |
| CN | 102256043 A | 11/2011 |
| CN | 103427902 A | 12/2013 |
| CN | 103701526 A | 4/2014 |

* cited by examiner

APPARATUS, METHODS, AND SYSTEMS FOR TRACKING AN OPTICAL OBJECT

CROSS REFERENCE TO RELATED APPLICATIONS

The present application is a 35 U.S.C. § 371 National Phase conversion of International (PCT) Patent Application No. PCT/CN2015/092935, filed on Oct. 27, 2015, the disclosure of which is incorporated by reference herein. The PCT International Patent Application was filed and published in English.

FIELD OF THE INVENTION

The present disclosure generally relates to the field of tracking objects using digital images.

BACKGROUND OF THE INVENTION

Motion capture or motion tracking is a technology for recording the movement of objects or people. In a traditional solution, a user may wear one or more sensors on a body part (e.g., on an arm), and a system may identify the movements of the body part by tracking the positions of the sensor(s). However, although this method may be ease to implement, there are some shortcomings. For example, computing requirements for tracking sensors may be very high, and tracking sensors in real-time (or with minimal delay) may be very difficult, if not impossible. In addition, the accuracy of existing methods and systems may greatly depend on ambient light. For instance, when the environment is dark, the accuracy may suffer tremendously and these methods and systems often fail to identify and track the sensors. The present disclosure aims to address at least some of these considerations.

SUMMARY OF THE INVENTION

One aspect of the present disclosure is directed to a system for identifying one or more light sources. The system may include an imaging device having a rolling shutter and configured to capture an image. The system may also include a memory device storing instructions and at least one processor that executes the instructions and may be configured to receive, from the imaging device, the captured image. The at least one processor may also be configured to detect whether the image includes a first set of alternating stripes. The at least one processor may further be configured to measure, if the image includes a first set of alternating stripes, a first width of at least one stripe of the first set of alternating stripes included in the image, and identify, based on the measured first width, a first light source causing the first set of alternating stripes. In some embodiments, the at least one processor may further be configured to detect whether the image includes a second set of alternating stripes, and if the image includes a second set of alternating stripes, measure a second width of at least one stripe of the second set of alternating stripes. The at least one processor may also be configured to identify, based on the measure second width, the second light source causing the second set of alternating stripes.

Another aspect of the present disclosure is directed to a control device for interacting with a gaming device. The control device may include an input configured to receive one or more inputs from a user, and a first light source. The control device may also include a controller in communication with the gaming device and configured to generate, based on the received one or more inputs, a first control signal for controlling the first light source. The first control signal may include a first light pulse frequency at which the first light source produces light pulses. The control device may further include a light modulator configured to control, based on the first control signal, the first light source to produce light pulses at the first light pulse frequency. In some embodiment, the control device may further include a second light source. The controller may further be configured to generate a second control signal for controlling the second light source, the second control signal including a second light pulse frequency at which the second light source produces light pulses. The light modulator may also be configured to control, based on the second control signal, the second light source to produce light pulses at the second pulse frequency.

Yet another aspect of the present disclosure is directed to a method for identifying one or more light sources. The method may include capturing, via an imaging device, an image, the imaging device having a rolling shutter. The method may also include receiving, via at least one processor, the captured image, and detecting, via the at least one processor, whether the image includes a first set of alternating stripes. The method may further include measuring, via the at least one processor, if the image includes a first set of alternating stripes, a first width of at least one stripe of the first set of alternating stripes included in the captured image, and identifying, via the at least one processor, a first light source causing the first set of alternating stripes based on the measured first width. In some embodiment, the method may further include detecting, via the at least one processor, whether the image includes a second set of alternating stripes, measuring, via the at least one processor, if the image includes a second set of alternating stripes, a second width of at least one stripe of the second set of alternating stripes, and identifying, via the at least one processor, the second light source causing the second set of alternating stripes based on the measure second width.

Yet another aspect of the present disclosure is directed to a method for interacting with a gaming device, the method may include receiving, via an input, one or more inputs from a user and generating, via a controller, a first control signal for controlling a first light source. The first control signal may include a first light pulse frequency at which the first light source produces light pulses based on the received one or more inputs. The method may further include controlling, via a light modulator, the first light source to produce light pulses at the first light pulse frequency based on the first control signal. In some embodiments, the method may also include generating, via the controller, a second control signal for controlling a second light source. The second control signal may include a second light pulse frequency at which the second light source produces light pulses. The method may further include controlling, via the light modulator, the second light source to produce light pulses at the second light pulse frequency based on the second control signal.

Yet another aspect of the present disclosure is directed to a non-transitory computer-readable medium storing instructions which, when executed, cause one or more processors to perform a method for identifying one or more light sources. The method may include capturing, via an imaging device, an image, the imaging device having a rolling shutter. The method may also include receiving, via at least one processor, the captured image, and detecting, via the at least one processor, whether the image includes a set of alternating stripes. The method may further include measuring, via the at least one processor, if the image includes a set of alternating stripes, a width of at least one stripe of the set of alternating stripes included in the captured image, and identifying, via the at least one processor, a light source causing the set of alternating stripes based on the measured width.

Yet another aspect of the present disclosure is directed to a non-transitory computer-readable medium storing instructions which, when executed, cause one or more processors to perform a method for interacting with a gaming device, the method may include receiving, via an input, one or more inputs from a user and generating, via a controller, a first control signal for controlling a light source The first control signal may include a light pulse frequency at which the light source produces light pulses based on the received one or more inputs. The method may further include controlling, via a light modulator, the light source to produce light pulses at the light pulse frequency based on the control signal.

DETAILED DESCRIPTION OF PREFERRED EMBODIMENTS

Reference will now be made in detail to the disclosed embodiments, examples of which are illustrated in the accompanying drawings. Wherever convenient, the same reference numbers will be used throughout the drawings to refer to the same or like parts.

The objects, features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended as a definition of the limits of the invention. As used in the specification and in the claims, the singular form of "a," "an," and "the" include plural referents unless the context clearly dictates otherwise. The phases "a pattern of alternating stripes" and "a set of alternating stripes" are used interchangeably in this application, The disclosure is directed to a system and method for tracking one or more light sources (e.g., light-emitting diode (LED) devices) using imaging technique. In some embodiments, a system may include an imaging device having an image sensor with a rolling shutter. The imaging device may be configured to capture one or more images of a light source in its field of view. The light source may be a modulated lighting device and configured to generate light pulses in a Pulse-Width Modulation (PWM) fashion. That is, the light source may generate light pulses at a pulse frequency (also called PWM switching frequency) in an on/off cycle fashion. The image captured by the imaging device may include a pattern of (or a set of) white/dark alternating stripes caused by the light pulses generated by the light source. The characteristic features of the alternating stripes (e.g., the widths or number of the stripes) may be related to the PWM duty cycle time (i.e., the "on" time in an on/off cycle) and the pulse frequency at which the light source generates light pulses. For example, the longer the duty cycle time, the larger the width of the stripes; the higher the pulse frequency, the smaller the width of stripes. The system may also include a controller configured to measure a width of at least one of the alternating stripes included in the captured image. The controller may further identify the light source based on the measured width of the stripe.

Thus, in some embodiments, the present disclosure provides embodiments for identifying one or more light sources based on the analysis of one single image frame. Compared with the existing solutions, the embodiments in the present disclosure have much higher resistance against interferences from ambient light. In addition, the embodiments of the present disclosure have better accuracy in identifying the target light source(s) in a complicated light environment. In addition, in the embodiments of the present disclosure, the frequencies of the light sources are determined based on the analysis of one image frame, thereby obviating the need for synchronizing the pulse frequencies of the light sources and further improving the efficiency for identifying the light sources.

Figure 1:
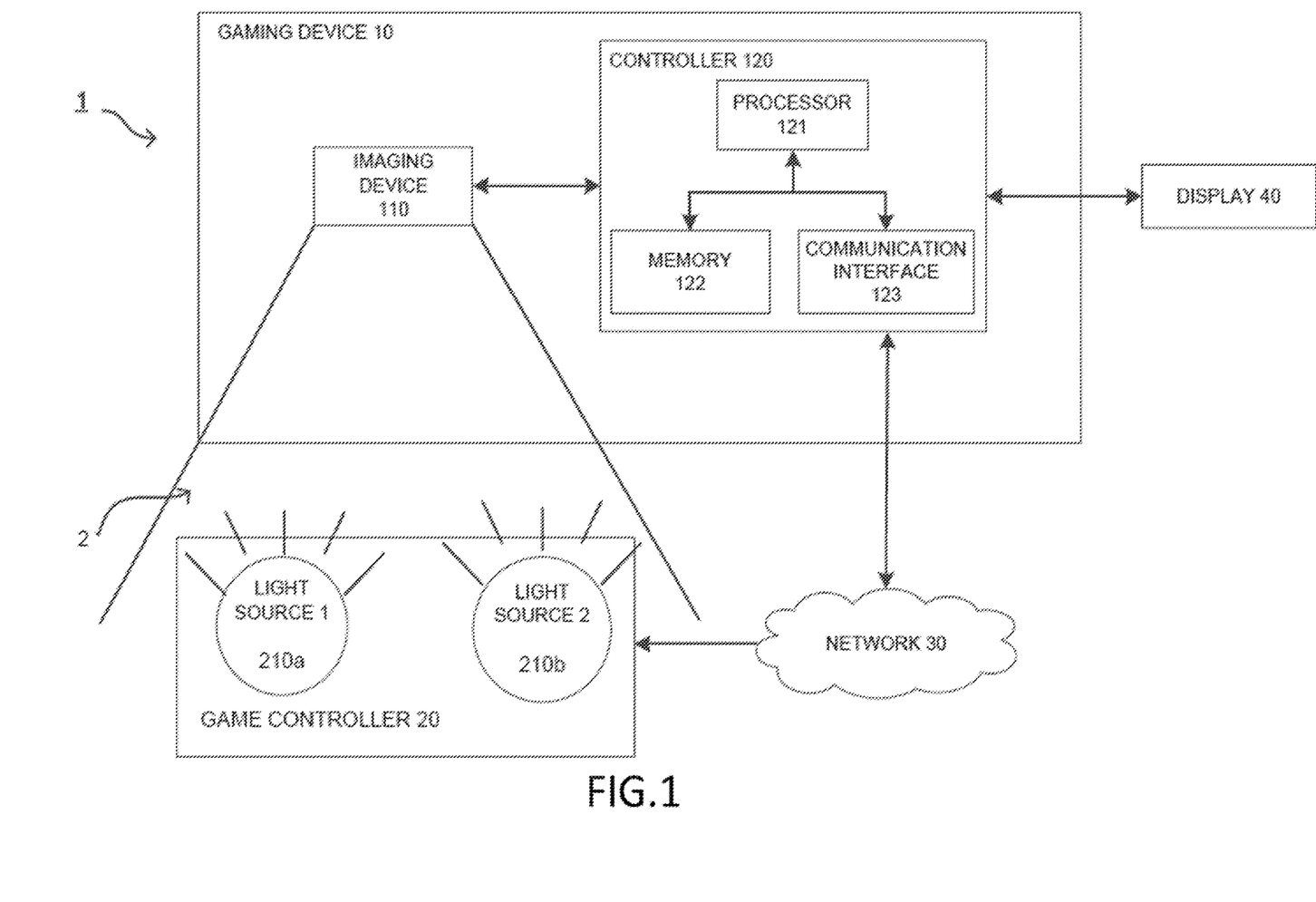
FIG. 1 is a block diagram of an exemplary system for tracking one or more light sources.

FIG. 1 is a block diagram of an exemplary embodiment of a system for tracking one or more light sources. As illustrated in FIG. 1, system 1 may include a gaming device 10, a game controller 20, network 30, and a display 40. Gaming device 10 may be a computing device such as, for example, a general purpose or notebook computer, mobile device, tablet, smartphone, wearable device such as Google Glass™ or smart watches, gaming console, or any combination of these computers and/or affiliated components. In some embodiments, gaming device 10 may include one or more imaging devices 110 configured to capture images of objects appearing within a field of view 2 of the imaging device(s).

Imaging device 110 may be any device capable of capturing images of the object(s) within its field of view 2. In some embodiments, imaging device 110 may be disposed at a fixed position. For example, it may be placed on display 40 or a TV stand. In some embodiments, it may be a part of gaming device 10, which may be placed on a table or a TV stand. In other embodiments, imaging device 110 may not have a fixed position. For example, it may be worn by a user (e.g., on an arm or the head of a user), and the user may move around. Imaging device 110 may be configured to capture images of the object(s) within its field of view 2 at different positions.

Imaging device 110 may include an image sensor (not shown). The image sensor may be a Complementary Metal Oxide Semiconductor (CMOS) sensor, a Charge-Coupled Device (CCD) sensor, or any type of image sensor capable of capturing incident photons and reading pixel data in a row-by-row fashion. In other words, different rows of the image sensor are exposed to light sequentially (e.g., from the top to the bottom or vice versa). Imaging device 110 may also include a rolling shutter (not shown) configured to expose different rows of pixel cells of the image sensor to light at different points in time in a row-by-row fashion. The rolling shutter may be electronic or mechanic. The exposure time of the captured image may be the time necessary to expose (or "digitalize") all rows and read data from all pixel cells in a row-by-row fashion. The rolling shutter may collect image data row by row, analogous to an open slit that scans over the image sequentially (e.g., from the top to the bottom or vice versa). Each row is exposed to light when the slit passes over it. Therefore, the lines of the image are not scanned at the same time. In some embodiment, when the image sensor captures an image including a light source producing light pulses and the duty cycle time of the light source is equal to or greater than twice the exposure time of the image, an artifact (or image distortion) including a pattern of alternating dark/white stripes may appear in the image. The stripes may have a same width. The width may be directly proportional to the duty cycle time and inversely proportional to the pulse frequency. In addition, the number of the stripes included in the pattern may be directly proportional to the pulse frequency.

In some embodiments, stripes may have different widths. For example, a light source may be changing its pulse frequency when an image is captured. Some of the stripes may have a same width, and the others may have different width(s). The light source causing the stripes with various widths may be identified based on characteristic features such as a pattern of the stripes (e.g., the widths of the individual stripes). In some embodiments, the widths of two or more stripes may be determined. The frequencies of the light source may also be determined based on the determined widths.

Figure 2:
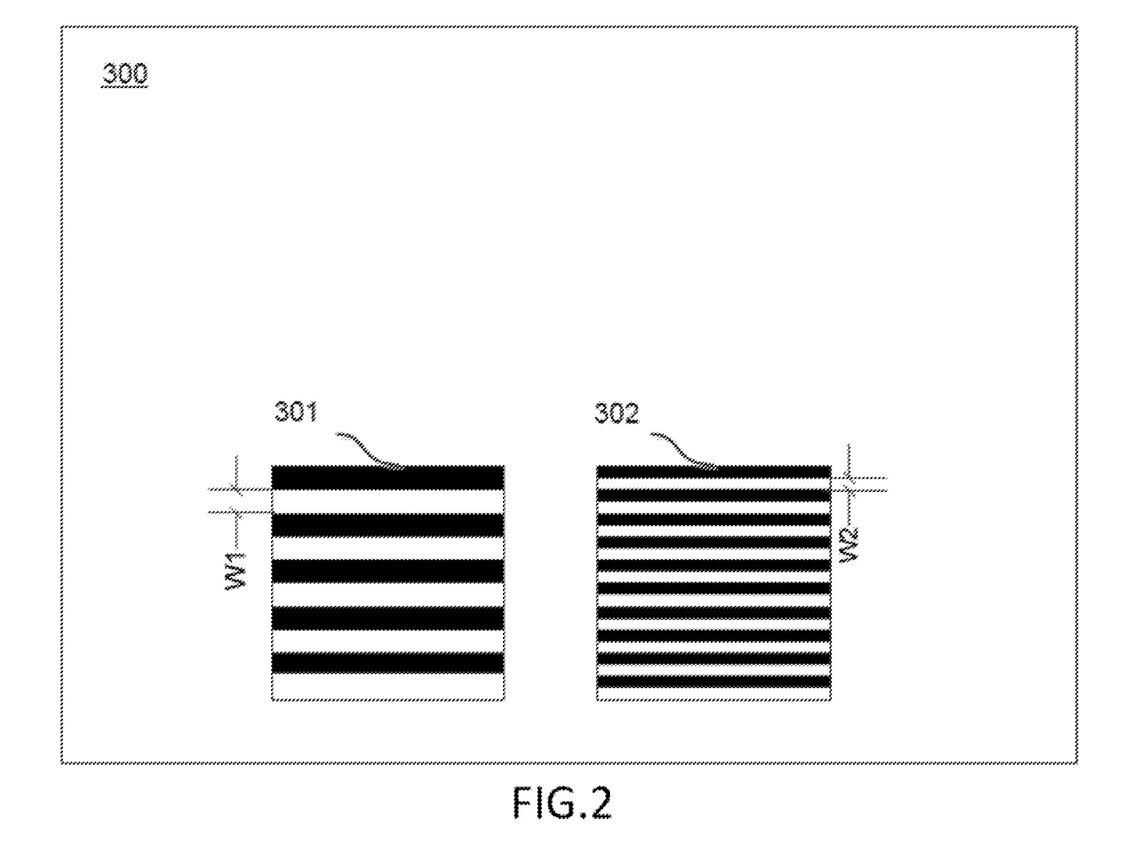
FIG. 2 is an exemplary image captured by the system of FIG. 1.

FIG. 2 is an exemplary image captured by system 1 in certain embodiments, which illustrates such a phenomenon. Image 300 is captured by imaging device 110 with field of view 2, in which two light source 210a and 210b are present (as illustrated in FIG. 1). Alternating-stripe patterns 301 and 302 may be caused by the light pulses generated by light sources 210a and 210b of game controller 20, respectively. Each stripe of alternating stripe pattern 301 may have a width W1, while each stripe of alternating stripe pattern 302 may have a width W2. Accordingly, light source 210a may have a lower pulse frequency than light source 210b because width W1 is larger than W2. In addition, the duty cycle time of light source 210a is greater than that of light source 210b.

In some embodiments, imaging device 110 may be configured to capture a plurality images at different time points over a period of time. For example, when a light source moves around within the field of view of imaging device 110, imaging device 110 may capture the images of the light source at different positions during the period of time. Imaging device 110 may also obtain time information when each of the images is captured. Imaging device 110 may further transmit the time information, along with the images, to gaming device 10 for further processing. For example, gaming device 10 may be configured to identify one or more light source(s) 210 included in the images, and track the positions of light sources 210 at the time points over the period of time. Gaming device 10 may further be configured to determine the movement(s) of the light source(s) 210 over the period of time.

In some embodiments, imaging device 110 may also include a position sensor (not shown) configured to determine the position of imaging device 110. Imaging device 110 may be also configured to transmit position data to gaming device 10. For example, imaging device 110 may include a GPS sensor configured to locate its position and transmit its coordinate data to gaming device 10. In some embodiments, if imaging device 110 is at a fixed position, its position information may be stored in memory 122 and accessible by processor 121.

Referring back to FIG. 1, imaging device 110 may be in communication with controller 120 and configured to transmit the image data to controller 120. Imaging device 110 may further be configured to receive command signals from controller 120 for setting parameters for capturing images. The exemplary parameters for capturing images may include parameters for setting exposure time, aperture, image resolution/size, field of view (e.g., zoom in and zoom out), and/or color space of images (e.g., color or black-and-white), and/or for performing other types of known functions of a camera. Imaging device 110 and controller 120 may be connected via network 30, or a network connection, bus, or other type of data link, such as a hardwire, wireless (e.g., Bluetooth™), or other connection known in the art.

Controller 120 may be configured to receive and process data/signals from other components of system 1. For example, controller 120 may receive and process image data from imaging device 110 and/or input data from game controller 20 as disclosed in this application. Controller 120 may also transmit data/signals to other components of system 1, and other components may perform certain functions based on the data/signals from controller 120. In some embodiments, controller 120 may include, among other things, a processor 121, memory 122, and a communication interface 123. Processor 101 may include any appropriate type of general-purpose or special-purpose microprocessor, digital signal processor, or microcontroller, Processor 101 may be configured as a separate processor module dedicated to tracking objects. Alternatively, processor 101 may be configured as a shared processor module for performing other functions unrelated to tracking objects.

Processor 121 may be configured to receive data and/or signals from various components of system 1 and/or gaming device 10 via, for example, network 30. Processor may also process the data and/or signals to determine one or more conditions of the operations of system 1 disclosed in this application. For example, processor 121 may receive an image from imaging device 110 and determine whether the image includes a pattern of (or a set of) alternating stripes. Processor 121 may also determine a width of at least one stripe included in the pattern. Additionally or alternatively, processor 121 may determine a number of the stripes included in the pattern. Processor 121 may further determine the pulse frequency at which the light source generated light pulses causing the alternating stripes, based on the determined width of the stripe and/or the determined number of the stripes. In some embodiments, processor 121 may identify the light source causing the alternating stripes based on the determined pulse frequency.

Memory 122 may include any appropriate type of mass storage provided to store any type of information that processor 121 may need to operate. Memory 122 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 122 may be configured to store one or more computer programs that may be executed by processor 121 to perform exemplary object tracking functions disclosed in this application. For example, memory 102 may be configured to store programs that may be executed by processor 121 to measure a width of a stripes included in an alternating-stripe pattern.

Memory 122 may be further configured to store information and data used by processor 121. For instance, memory 122 may be configured to store a look-up table including identities of light sources and their corresponding pulse frequencies (or ranges thereof). Processor 121 may determine an identity of a light source causing a set of alternating stripes in an image by consulting the look-up table if a pulse frequency has been obtained.

Communication interface 123 may be configured to facilitate communications between controller 120 and other components of system 1 via, for example, network 30. For instance, controller 120 may receive input data/signals from game controller 20, via communication interface 123, for controlling a character in a game. Controller 120 may also transfer data/signals, via communication interface 123, to display 40 for presenting game plays (image, video, and/or sound signals).

Network 30 may include, or be part of, any one or more of a variety of networks or other types of communication connections known to those skilled in the art. Network 30 may include a network connection, bus, or other type of data link, such as a hardwire or other connection known in the art. For example, network 30 may include or be part of the Internet, an intranet network, a local area network, or other wireless or other hardwired connection or connections (e.g., Bluetooth, WiFi, 4G, LTE cellular data networks, etc.) through which the components of system 1 may communicate.

Display 40 may be configured to present video game plays based on the signals transmitted from gaming device 10. In some embodiments, display 40 may be a device separated from gaming device 10 such as a standalone standard television, HDTV, digital TV, or any type of display device (e.g., LED, OLED, or LCD), etc. In other embodiments, display 40 may be a part of gaming device 10 (e.g., a screen of a laptop, a mobile device, a wearable device etc.).

Game controller 20 may be in communication with gaming device 10 for interacting with one or more characters in the game. For example, game controller 20 may receive an input from a user, and transmit a signal based on the received input to gaming device 10, which may then process the signal and/or change game play(s) based on the signal. In some embodiments, game controller 20 may receive, from gaming device 10, data/signals for controlling its components. For instance, gaming device 10 may transmit data/signals for setting the pulse frequency/frequencies of light source(s) 210 (i.e., a part of game controller 20), and game controller 20 may set the pulse frequency/frequencies via, for example, light modulator(s) 240, based on the received data/signals.

Figure 3:
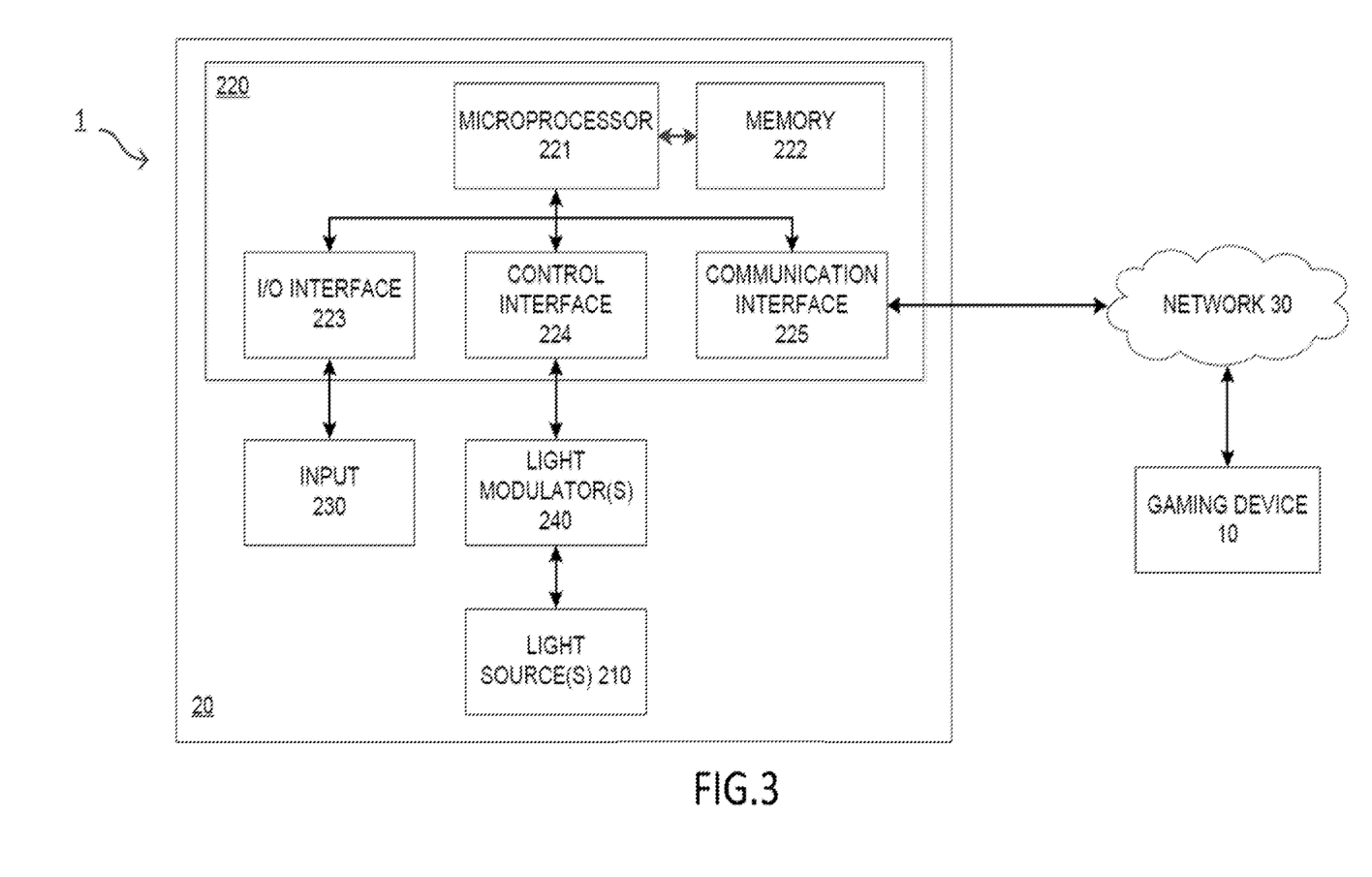
FIG. 3 is a block diagram of an exemplary game controller of the system of FIG. 1.

In some embodiments, as illustrated in FIG. 3, game controller 20 may include a microcontroller 220, an input 230, one or more light modulators 240, and one or more light sources 210 (e.g., light sources 210a and 210b shown in FIG. 1). Microcontroller 220 may be configured to receive and process data/signals from other components of game controller 20 and/or system 1. For example, microcontroller 220 may receive, from input 230, input data generated in response to or by the user's actions and/or inputs.

Microcontroller 220 may also generate input data based on the inputs by the user and transmit the data to gaming device 10 for further processing. In some embodiments, microcontroller 220 may generate control signals for controlling other components of game controller 20. For instance, microcontroller 220 may generate control signals for actuating light source(s) 210, and/or setting the pulse frequency of light source(s) 210 based on inputs from the user and/or signals received from gaming device 10.

Microcontroller 220 may include a microprocessor 221, memory 222, an I/O interface 223, a control interface 224, and a communication interface 225. Microprocessor 221 may be configured to receive, generate, and/or process data/signals for performing the functions of game controller 20. Microprocessor 221 may include any appropriate type of general-purpose or special-purpose microprocessor, digital signal processor, or microcontroller. Memory 222 may include any appropriate type of mass storage provided to store any type of information that microprocessor 221 may need to operate. Memory 222 may be a volatile or nonvolatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 222 may be configured to store one or more computer programs that may be executed by microprocessor 221 to perform exemplary functions disclosed in this application. For example, memory 222 may be configured to store programs that may be executed by microprocessor 221 to set or adjust the pulse frequency of light sources 210.

I/O interface 223 may be configured to facilitate communications between microprocessor 221 and input 230. For example, microprocessor 221 may receive input data via I/O interface 223 from input 230 in response to the user's inputs. Control interface 224 may be configured to facilitate communications between microprocessor 221 and light modulator(s) 240. For instance, microprocessor 221 may transmit a control signal, via control interface 224, to light modulators 240 for actuating and/or setting the pulse frequency of light source(s) 210. Communication interface 225 may be configured to facilitate communications between the components of game controller 20 and other components of system 1. For example, game controller 20 may communicate, via communication interface 225, with gaming device 10 over network 30.

Input 230 may be configured to generate input data in response to the user's actions and/or inputs. Exemplary input and/or action by the user may include a touch input, gesture input (e.g., hand waving, etc.), a key stroke, force, sound, speech, face recognition, finger print, hand print, or the like, or a combination thereof. Input 230 may be a plurality of buttons, a joystick, a touch pad, a key pad, an imaging sensor, a sound sensor (e.g., microphone), a force sensor, a motion sensor, or a finger/palm scanner, or the like, or a combination thereof. Input 230 may also be configured to transmit input data, via I/O interface 223, to microprocessor 221 for further processing. For example, input 230 may generate input data in response the user's actuating buttons (i.e., a part of input 230) and transmit the input data to microprocessor 221. Microprocessor 221 may generate one or more control signals for setting the pulse frequency/frequencies of light source(s) 210 based on the input data. Microprocessor 221 may further transmit the control signal(s) to light modulator(s) 240, which may then control light source(s) 210 to produce light pulses at the pulse frequency/frequencies specified by microprocessor 221 based on the control signal(s). In some embodiments, microprocessor 221 may transmit, via communication interface 225, the input data received from input 230 to gaming device 10 for further processing.

Light modulator(s) 240 may be configured to receive one or more control signals (e.g., digital inputs) from microprocessor 221 for controlling light source(s) 210. For example, light modulator 240 may receive a control signal from microprocessor 221 to actuate light source(s) 210. The control signal may specify a pulse frequency at which light source(s) 210 may produce light pulses, and the duration of actuating light source(s) 210. In some embodiments, the control signal may also specify a color of light pulses that light source(s) 210 may produce. Light modulator 240 may modulate light source(s) 210 according to the control signal. In some embodiments, light modulator 240 may be a single chip microcontroller configured to turn on or off light source(s) 210 by allowing or blocking current flow through light source(s) 210 based on control signals.

Light source(s) 210 may include one or more light generating devices capable of generating light pulses at a pulse frequency specified by light modulator 240. For example, light source(s) 210 may include one or more LED's that can produce light pulses. In some embodiments, the pulse frequency of light source(s) 210 may be any frequency between 1,000 to 7,000 Hz. In other embodiments, the frequency may be restricted to subranges, such as, 1,000 to 2,000 Hz, 2,000 to 3,000 Hz, 3,000 to 4,000 Hz, 4,000 to 5,000 Hz, 5,000 to 6,000, or 6,000 to 7,000 Hz, or the like. In addition, the pulse frequency of light source(s) 210 may be a frequency such that the duty cycle time of light source(s) 210 may be equal to or longer than twice the exposure time of images captured by imaging device 110. For instance, if the exposure time is 1/4000 second, the duty cycle time of light source(s) 210 may be equal to or longer than 1/2000 second (or the pulse frequency may be equal to or less than 2,000 Hz). As such, a pattern of alternating stripes may appear in an image of light source(s) 210 captured by imaging device 110. The identity of light source(s) 210 may be determined by gaming device 10 based on an analysis of the pattern of alternating stripes as disclosed elsewhere in this application.

In some embodiments, light source 210 may change its pulse frequency when the image is being captured. For example, light source 210 may change its pulse frequency from 5,000 to 4,000 Hz when the image is being captured. The set of alternating stripes may have two different widths—the stripes with a first width may be caused by the light pulses produced by light source 210 at 5,000 Hz and the stripes with a second width may be caused by the light pulses produced at 4,000 Hz. The embodiments, however, are not limited to two different widths.

In some embodiments, two or more widths of the alternating stripes may be determined as disclosed elsewhere in this application. The identity of light source 210 may also be determined based on the measured widths as disclosed elsewhere in this application. The frequencies of the light pulses may further be determined based on the determined widths as disclosed elsewhere in this application. The advantages of producing light pulses at different frequencies by one light source when the image is being captured may include enhanced security and flexible arrangement using a same type of light source. For example, in some embodiments, a same type of light sources may be configured to produce light pulses at different frequencies when an image is being captured. Light source A may produce light pulses at frequency 1 and then at frequency 2 when the image is being captured. Light source B may produce light pulses at frequency 2 first and then frequency 1 during the same period of time. Yet light source C may produce light pulses at frequency 1 first, frequency 2, and then frequency 1 again during the same period of time. The identities of light sources A, B, and C may be determined based on the widths of the stripes and/or the order of the stripes with different widths appearing in in each set of the alternating stripes caused by the light sources. As such, a same type of light sources may be configured to obtain numerous "different" light sources. In addition, an unauthorized device may be used to capture an image of the light sources and attempt to identify the light sources. Producing light pulses at multiple pulse frequencies by individual light sources may prevent an unauthorized device from obtaining the identity information of the light sources if the unauthorized device only knows the frequencies at which the light sources can produce. The security of the system may thus be improved.

In some embodiments, different light sources 210 may be configured to produce light pulses at different pulse frequencies. For example, a light source 210 may produce light pulses at 2,000 Hz, another light source 210 may produce light pulses at 3,000 Hz, and yet another light source 210 may produce light pulses at 3,600 Hz. In some embodiments, if there are two or more light sources 210, the difference(s) in the pulse frequencies of light sources 210 may be equal to or greater than 200 Hz. For example, if there are three light sources 210, the pulse frequencies of these three light sources may be 2,000 Hz, 2,300 Hz, 2,600 Hz, respectively. In some embodiments, light source(s) 210 may also be configured to generate light pulses in different colors (e.g., white, red, yellow, green, blue, etc.) specified by control signals. Gaming device 10 may be configured to identify light source(s) 210 based on a color of the light pulses and/or the pattern of alternating stripes appearing in an image.

In some embodiments, light source(s) 210 and light modulator(s) 240 may be packaged in the same casing with other components of game controller 20 (e.g., input 230). In other embodiments, light source(s) 210 and/or light modulator(s) 240 may be separated from other components of game controller 20. For instance, the user may wear light source(s) 210 (e.g., on an arm or the head), while holding game controller 20 in a hand. Light source(s) 210 and light modulator(s) 240 may be in communication with other components of game controller 20 via, for example, network 30. In some embodiments, two or more light sources 210 may be attached to different body parts of a user. For example, a user may hold a first light source 210 in his or her left hand, and hold a second light source 210 in his or her right hand. Gaming device 10 may be configured to identify the first and second light sources 210 and further determine positions thereof as disclosed elsewhere in this application. In other embodiments, there may be a plurality of users, and one or more light sources 210 may be attached to each of the users. Gaming device 10 may be configured to detect light sources 210 attached to the users within the field of view of imaging device 110, as disclosed else wherein this application.

Figure 4:
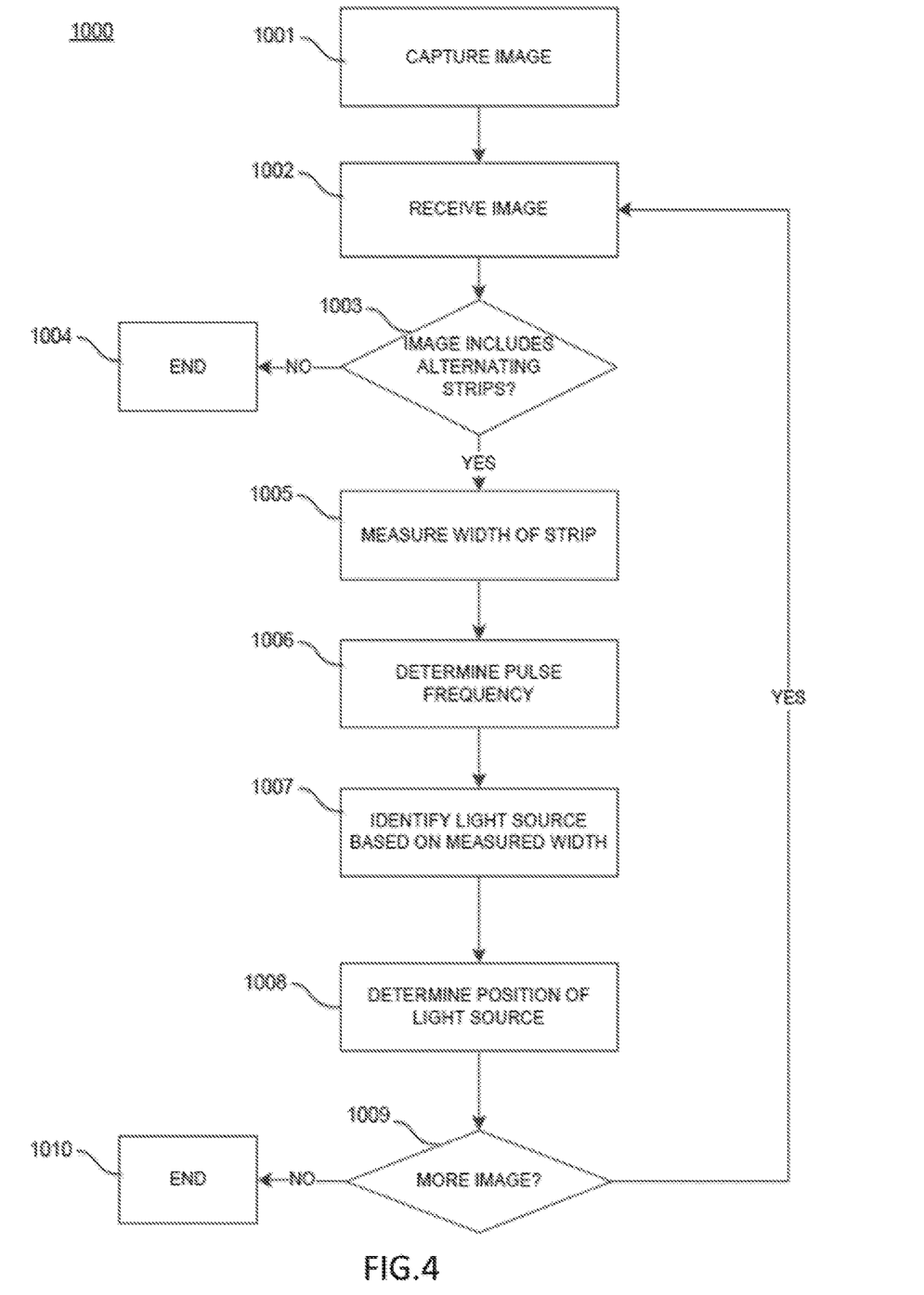
FIG. 4 is a flowchart of an exemplary process performed by the system of FIG. 1 for tracking one or more light sources.

FIG. 4 is an exemplary flowchart of method 1000 for identifying one or more light sources. At 1001, imaging device 110 may capture one or more images of the object(s) within its field of view. In some embodiments, imaging device 110 may capture images continuously. Additionally or alternatively, capturing an image may be triggered by a special event or the data/signals transmitted from controller 120 of gaming device 10 and/or game controller 20. For example, the user may actuate input 230 of game controller 20. Game controller 20 may transmit a signal for actuating imaging device 110 to capture one or more images based on the user's input. Alternatively, game controller 20 may transmit input data to gaming device 10, which may then actuate imaging device 110 to capture one or more images. In some embodiments, an event in the game play may trigger capturing an image by imaging device 110. Additionally or alternatively, imaging device 110 and/or gaming device 10 may include a sensor (not shown) configured to detect the object(s) within the field of view of imaging device 110. For example, an ultrasonic sensor may be used to detect one or more objects in the field of view of imaging device 110. If an object is detected, imaging device 110 may be actuated to capture one or more images.

In some preferred embodiments, imaging device 110 may be configured to set the exposure time equal to or shorter than half of the duty cycle time of light source(s) 210. In other embodiments, the exposure time may be set longer than half of the duty cycle time of light source(s) 210. Parameters for setting the exposure time may be stored in memory of imaging device 110 (not shown). For example, imaging device 110 may select an exposure time from a plurality predetermined exposure times. In some embodiments, if the duty cycle time(s) of light source(s) 210 is/are known, imaging device 110 may set a longest exposure time that is equal to or shorter than half of the shortest duty cycle time(s) among all duty cycle times of light sources 210 For example, in some embodiments, system 1 may include two light sources 210, one with a duty cycle time of 1/2000 second and anther of 1/2400 second. Imaging device 110 may set the exposure time equal to or shorter than 1/4800 second (i.e., half of 1/2400 second, the shorter duty cycle time between two duty cycle times). In other embodiments, the exposure time may be set longer than 1/4800 second.

In some embodiments, imaging device 110 may also be configured to obtain depth information indicating the position(s) of the object(s) included in the image. Imaging device 110 may further determine its own position by its position sensor. In some embodiments, imaging device 110 may be configured to capture images in color, or black and white. In some embodiments, imaging device 110 may optionally process the captured images and transmit the processed images to gaming device 10. For example, imaging device 110 may resize, denoise, and/or sharpen images. Imaging device 110 may also increase/decrease contract and/or brightness of images. Other types of image processing technique are also contemplated. Imaging device 110 may further transmit the processed images to gaming device 10.

In some embodiments, imaging device 110 may receive parameters for capturing images from gaming device 10 and/or game controller 20. The exemplary parameters for capturing images may include parameters for setting exposure time, aperture, image resolution/size, field of view (zoom in and zoom out), and/or color space of images (e.g., color or black-and-white), and/or for performing other types of known functions of a camera.

At 1002, controller 120 of gaming device 10 may receive the image from imaging device 110. In some embodiments, gaming device 10 may also receive the depth information indicating the position(s) of the light source(s) and/or the position information of imaging device 110.

In some embodiments, at 1002, controller 120 may optionally process the received image in order to increase efficiency. For example, controller 120 may convert a color image into a black-and-white image, and/or resize the image, thereby reducing the computing requirements later in the method. Additionally or alternatively, controller 120 may reduce noise in the image, sharpen the image, and/or increase (or decrease) contract and/or brightness of the image such that alternating stripes may be easier to detect. Other types of image processing techniques are also contemplated.

At 1003, controller 120 may determine whether the received image (or processed image, if processed) includes one or more sets of alternating stripes. If not, the method may end at 1004. On the other hand, if one or more sets of alternating stripes are detected, at 1005, controller 120 may measure a width of at least one stripe of each set of the alternating stripes detected. Each set of alternating stripes may be caused by one single light source and have a same width. In some embodiments, controller 120 may measure the width of the stripe by determining a number of pixels included in the stripe vertically. Additionally or alternatively, controller 120 may identify the characteristic features of the alternating stripes, including the width of the stripes, by processing the image through Fourier transform. Merely by way of example, controller 120 may receive image 300 (as shown in FIG. 2) from imaging device 110. Controller 120 may detect two sets of alternating stripes 301 and 302 in the image. Controller 120 may measure a width of at least one stripe for each of alternating-stripe pattern 301 and 302.

Additionally or alternatively, at 1005, controller 120 may determine a number of the stripes included in a set of alternating stripes. For example, controller 120 may receive image 300 from imaging device 110 (as shown in FIG. 3). Controller 120 may detect two sets of alternating stripes 301 and 302 in the image. Controller 120 may determine a number of the stripes included in each of patterns 301 and 302. Merely by way of example, controller 120 may identify the alternating stripes having same feature characteristics (e.g., the width, length, etc.) by processing the image through Fourier transform.

At 1006, controller 120 may determine the pulse frequency/frequencies of light source(s) causing the alternating stripes based on the determined width of the strip and/or number of the stripes included in the set(s) of the alternating stripes.

At 1007, controller 120 may identify the light source(s) causing the set(s) of the alternating stripes based on the determined width of the strip and/or the number of the stripes. Additionally or alternatively, controller 120 may identify the light source(s) based on the determined pulse frequency/frequencies. For example, controller 120 may consult a look-up table stored in memory 122, including correlation information of a plurality of light sources with their corresponding stripe widths, stripe numbers, pulse frequencies, and/or color of lights. Merely by way of example, memory 122 may store a look-up table including correlation information between identities of light sources 210a and 210b (e.g., ID's and/or names) and their corresponding strip widths W1 and W2 and/or stripe numbers of the stripes included in the patterns 301 and 302 (as shown in FIG. 3).

At 1008, controller 120 may determine the position(s) of the light source(s) based on the position(s) of the pattern(s) of alternating stripes in the image. For example, controller 120 may determine the position(s) of the light source(s) based on the depth data included in the image and/or the position data of imaging device 110 (e.g., GPS data). Additionally or alternatively, controller 120 may also determine the relative position(s) of light source(s) to imaging device 110 based on the image data, and further determine the position(s) of the light source(s) based on the determined relative position(s) and the position of imaging device 110.

At 1009, controller 120 may determine whether there is a new image available for analyzing. If not, method 1000 may end at 1010. If there is a new image to be analyzed, steps 1002 through 1010 (if applicable) may be performed, as disclosed in this application. Controller 120 may further control game play based, at least in part, on the identity/identities of the light source(s) and/or the determined position(s) of the light source(s).

Figure 5:
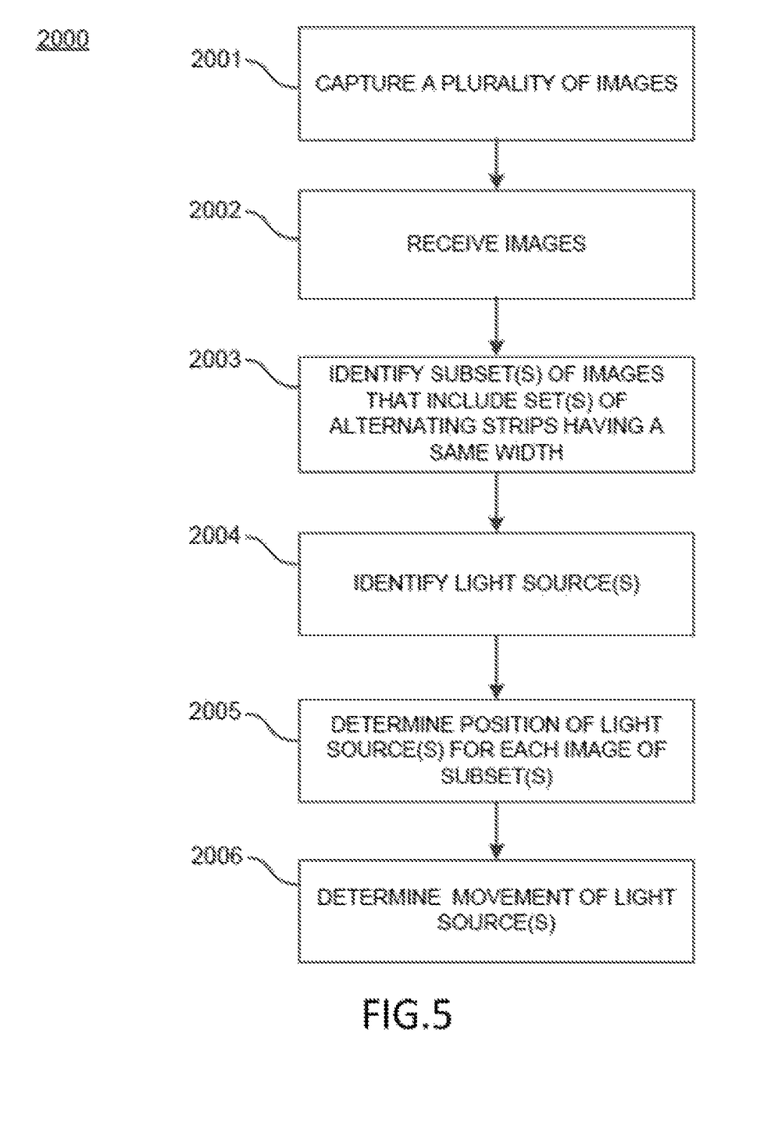
FIG. 5 is a flowchart of another exemplary process performed by the system of FIG. 1 for tracking one or more light sources.
Figure 6:
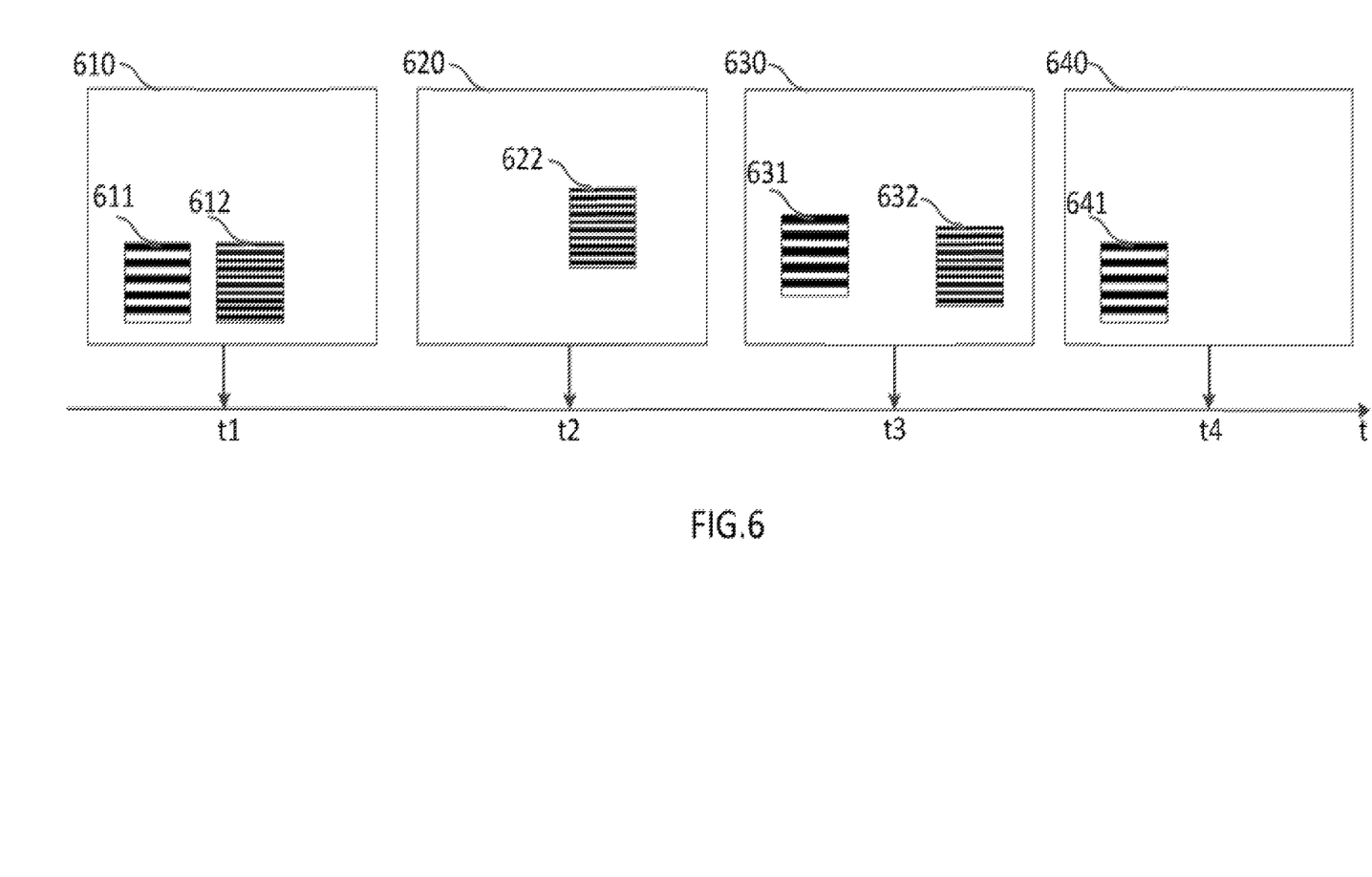
FIG. 6 is a series of exemplary images captured by the system of FIG. 1 at different time points.

In some embodiments, system 1 may be configured to determine movement(s) of one or more light sources over a period of time. FIG. 5 is an exemplary flowchart of method 2000 for determining the movement(s) of one or more light sources over a period of time. At 2001, imaging device 110 may be configured to capture a plurality of images at different time points over a period of time. The method of capturing images by imaging device 110 may be similar to step 1001 described above). Imaging device 110 may also obtain time information associated with the images (e.g., the time point at which each of the images was captured). Merely by way of example, as illustrated in FIG. 6, imaging device 110 may capture four images 610, 620, 630, and 640 at time points t1, t2, t3, and t4, respectively. Each of images 610, 620, 630, and 640 may include a pattern of alternating stripes caused by light sources 210a and/or a pattern of alternating stripes caused by light source 210b (shown in FIG. 1). Images 620 and 640 do not have both patterns because either of light sources 210a and 210b was not actuated when the images were captured. Imaging device 110 may further transmit the time information (e.g., t1, t2, t3, and t4), along with the image data, to gaming device 10 for further processing.

At 2002, controller 120 of gaming device 10 may receive the plurality of the images. The method of receiving the images may be similar to step 1003 described above. Controller 120 may also be configured to receive the time information associated with each of the images, including, for example, the time of being captured. At 2003, controller 120 may be configured to detect one or more patterns of alternating stripes in the images received, as disclosed elsewhere in this application (e.g., step 1003 described above). Controller 120 may also be configured to measure a width of at least one stripe of each set of the alternating stripes detected, as disclosed elsewhere in this application (e.g., a part of step 1005 described above). Additionally or alternatively, controller 120 may be configured to determine a number of the stripes in the set(s) of the alternating stripes, as disclosed elsewhere in this application (e.g., a part of step 1005 described above). Controller 120 may also optionally determine the pulse frequency based on the determined width of the strip and/or the number of the stripes included in the set of the alternating stripes, as disclosed elsewhere in this application (e.g., step 1006 described above).

Controller 120 may further be configured to identify a subset of the images, each image of which may include a similar pattern of alternating stripes (e.g., at least some of the alternating stripes included in each image of the subset have a same width). Merely by way of example, referring to FIG. 6, controller 120 may determine that image 610 includes patterns 611 and 612, image 620 includes pattern 622, image 630 include patterns 631 and 632, and image 640 include pattern 641. Controller 120 may also determine that patterns 611, 631, and 641 may share some same characteristic features, and patterns 612, 622, and 632 may share some same characteristic features. For instance, each of patterns 611, 631, and 641 may include at least one stripe having a first same width (i.e., width W1), and each of patterns 612, 622, and 632 may include at least one stripe having a second same width (i.e., width W2). In some embodiments, each of patterns 611, 631, and 641 may have a first same number of stripes, and each of patterns 612, 622, and 632 may have a second same number of stripes. Controller 120 may further categorize images 610, 630, and 640 as a first subset and images 610, 620, and 630 as a second subset based on the shared characteristic features. Controller 120 may also associate the subsets of the images with the time information of each image included therein.

At 2004, controller 120 may identify the light source(s) causing the alternating-stripe pattern(s) detected in the images, as disclosed elsewhere in this application. Controller 120 may also associate the subset(s) of the images with identification information of the light source(s). In some embodiments, step 2004 may be performed before step 2003. That is, controller 120 may identify the light source(s) for each of the plurality of images received before identifying subset(s) of the images have shared characteristic features.

At 2005, controller 120 may determine, for each image of the identified subsets, a position/positions of the light source(s) at a time point when each image was captured. The position-determining method may be similar to step 1008 described above. Merely by way of example, controller 120 may determine the positions of light sources 210a and 210b (shown in FIG. 1) based on the position of the alternating-stripe patterns in the images. Additionally or alternatively, the positions of light sources 210a and 210b may be determined based on the depth data included in image 610 (shown in FIG. 6) for patterns 611 and 612, and/or the position data of imaging device 110 (e.g., GPS data) at time point t1. Controller 120 may also determine the position of light source 210b at time point t2, and the positions of light sources 210a and 210b at time point t3. Controller 120 may further associate the positions of the light source(s) with the time information (e.g., when the images were captured).

At 2006, controller 120 may determine a movement/movements of the light source(s) over the period of time based on the positions at different time points during the period of time. Merely by way of example, controller 120 may determine a movement of light source 210a moving from time point t1 to time point t4 based on the determined positions of light source 210a at t1, t2, and t4. Controller 120 may further control game play based on the determined movement(s) of the light source(s).

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for identifying one or more light sources, the system comprising a gaming device and a game controller interacting with the gaming device;

wherein the gaming device comprises:

an imaging device comprising:

a rolling shutter; and             an image sensor, wherein rows of the image sensor are exposed to light in a row-by-row fashion to capture an image;

a controller comprising:
    a memory device that stores instructions; and
    at least one processor that executes the instructions and is configured to:
        receive, from the imaging device, the captured image;
        detect, whether the captured image comprises a first set of alternating stripes;
        measure, if the image comprises the first set of alternating stripes, a first order of the stripes with different widths appearing in a period of time of at least one stripe of the first set of alternating stripes comprised in the captured image; and
        identify, based on the first order of the stripes with different widths in the first set of alternating stripes, a first light source causing the first set of alternating stripes;
    wherein the game controller comprises:
        a first light source disposed on the game controller; and
        a light modulator, configured to control, based on a first control signal, the first light source to produce light pulses at different light pulse frequencies to form the first set of alternating stripes.

2. The system of claim 1, wherein the at least one processor is further configured to:
    determine, based on a measured first width, a first pulse frequency at which the first light source produces light pulses causing the first set of alternating stripes; and
    identify, based on the determined first pulse frequency, the first light source.

3. The system of claim 2, wherein:
    the memory device is further configured to store information relating to a plurality of light sources and a plurality of corresponding pulse frequencies at which the plurality of light sources produce light pulses; and
    the at least one processor is further configured to access the stored information and identify the first light source among the plurality of light sources based on the determined first pulse frequency and the stored information.

4. The system of claim 1, wherein an exposure time of the captured image is equal to or less than a half of a duty cycle time of the first light source.

5. The system of claim 1, wherein: the game controller comprises a second light source;
    the at least one processor is further configured to:
    detect whether the captured image includes a second set of alternating stripes;
    measure, if the captured image includes the second set of alternating stripes, a second order of the stripes with different widths appearing in a period of time of at least one stripe of the second set of alternating stripes; and
    identify, based on the second order of the stripes with different widths in the second set of alternating stripes, the second light source causing the second set of alternating stripes;
    wherein the first order is different from the second order.

6. The system of claim 5, wherein a frequency difference between a first pulse frequency at which the first light source produces light pulses causing the first set of alternating stripes and a second pulse frequency at which the second light source produces light pulses causing the second set of alternating stripes is equal to or greater than 200 Hz.

7. The system of claim 1, wherein the at least one processor is further configured to determine a position of the first light source based, at least in part, on a position of the first set of alternating stripes in the captured image.

8. The system of claim 7, further comprising a position sensor configured to determine a position of the imaging device, wherein determining, by the at least one processor, the position of the first light source is further based, at least in part, on the position of the imaging device.

9. The system of claim 1, wherein:
    the imaging device is further configured to capture images at a plurality of time points over a period of time; and
    the at least one processor is further configured to:
    identify a first subset of the captured images, each image of the first subset including the first set of alternating stripes with a first width, the first set of alternating stripes caused by the first light source;
    determine, for each image of the first subset, a position of the first light source at a time point at which the each image of the first subset was captured based, at least in part, on a position of the first set of alternating stripes included in the each image of the first subset;
    determine a movement of the first light source over the period of time based on the determined positions of the first light source over the period of time.

10. The system of claim 9, further comprising a position sensor configured to determine a position of the imaging device at each of the plurality of times points, wherein determining, for the each image of the first subset, the position of the first light source at the time point at which the each image of the first subset was captured is further based, at least in part, on the determined position of the imaging device at the time point.

11. The system of claim 9, wherein the at least one processor is further configured to:
    identify a second subset of the captured images, each image of the second subset including a second set of alternating stripes with a second width, the second set of alternating stripes caused by a second light source;
    determine, for each image of the second subset, a position of the second light source at a time point at which the each image of the second subset was captured based, at least in part, on a position of the second set of alternating stripes in the each image of the second subset;
    determine a movement of the second light source over the period of time based, at least in part, on the determined positions of the second light source over the period of time.

12. The system of claim 11, wherein the determining, for the each image of the second subset, the position of the second light source at the time point at which the each image of the second subset was captured is further based, at least in part, on a position of the imaging device at the time point.

13. The system of claim 1, wherein the imaging device is disposed at a fixed position.

14. The system of claim 1, further comprising a display configured to present video game played based on signals transmitted from the gaming device, wherein the display is separated from the gaming device or be a part of the gaming device.

15. A method for identifying one or more light sources, the method comprising:
    capturing, via an imaging device disposed at a fixed position, an image, the imaging device having a rolling shutter and an image sensor, wherein rows of the image sensor are exposed to light in a row-by-row fashion to capture the image;
    receiving, via at least one processor, the captured image;
    detecting, via the at least one processor, whether the captured image comprises a first set of alternating stripes;

measuring, via the at least one processor, if the captured image comprises a first set of alternating stripes, a first order of the stripes with different widths appearing in a period of time of at least one stripe of the first set of alternating stripes comprised in the captured image; and identifying, via the at least one processor, a first light source causing the first set of alternating stripes based on the first order of the stripes with different widths in the first set of alternating stripes to determine a gesture of a game controller on which the first light source is disposed.

16. The method of claim 15, further comprising:
determining, via the at least one processor, a first pulse frequency at which the first light source produces light pulses causing the first set of alternating stripes based on the measure first width; and
identifying, via the at least one processor, the first light source based on the determined first pulse frequency.

17. The method of claim 16, wherein:
storing, via a memory device, information relating to a plurality of light sources and a plurality of corresponding pulse frequencies at which the plurality of light sources produce light; and
identifying, via the at least one processor, the first light source among the plurality of light sources based on the determined first pulse frequency and the stored information.

18. The method of claim 15, wherein an exposure time of the captured image is equal to or less than a half of a duty cycle time of the first light source.

19. The method of claim 15, further comprising:
detecting, via the at least one processor, whether the image includes a second set of alternating stripes;
measuring, via the at least one processor, if the image includes a second set of alternating stripes, a second order of the stripes with different widths appearing in a period of time of at least one stripe of the second set of alternating stripes; and
identifying, via the at least one processor, the second light source causing the second set of alternating stripes based on the second order of the stripes with different widths in the second set of alternating stripes;
wherein the first order is different from the second order.

20. The method of claim 19, wherein a frequency difference between a first pulse frequency at which the first light source produces light pulses causing the first set of alternating stripes and a second pulse frequency at which the second light source produces light pulses causing the second set of alternating stripes is equal to or greater than 200 Hz.

21. The method of claim 15, further comprising:
capturing, via the imaging device, images at a plurality of time points over a period of time;
identifying, via the at least one processor, a first subset of the captured images, each image of the first subset including the first set of alternating stripes with a first width, the first set of alternating stripes caused by the first light source;
determining, via the at least one processor, for each image of the first subset, a position of the first light source at a time point at which the each image of the first subset was captured based, at least in part, on a position of the first set of alternating stripes in the each image of the first subset; and
determining, via the at least one processor, a movement of the first light source over the period of time based on the determined positions of the first light source over the period of time.

22. The method of claim 21, further comprising:
identifying, via the at least one processor, a second subset of the captured images, each image of a second subset including the second set of alternating stripes with a second width, the second set of alternating stripes caused by a second light source;
determining, via the at least one processor, for each image of the second subset, a position of the second light source at a time point at which the each image of the second subset was captured based, at least in part, on a position of the second set of alternating stripes in the each image of the second subset; and
determining, via the at least one processor, a movement of the second light source over the period of time based, at least in part, on the determined positions of the second light source over the period of time.

23. The method of claim 15, further comprising determining, via the at least one processor, a position of the first light source based, at least in part, on a position of the first set of alternating stripes in the image.

24. A non-transitory computer readable medium embodying a computer program product, the computer program product comprising instructions configured to cause a computing device to perform a method comprising:
capturing, via an imaging device disposed at a fixed position, an image, the imaging device having a rolling shutter and an image sensor, wherein rows of the image sensor are exposed to light in a row-by-row fashion to capture the image;
receiving the captured image;
detecting whether the image comprises a set of alternating stripes;
measure, if the image comprises a set of alternating stripes, an order of the stripes with different widths appearing in a period of time of at least one stripe of the set of alternating stripes comprised in the captured image; and
identify a light source that causes the set of alternating stripes based on the order of the stripes with different widths appearing in a period of time to determine a gesture or movement of a game controller on which the light source is disposed.

* * * * *